United States Patent
Chang et al.

(10) Patent No.: US 11,354,210 B2
(45) Date of Patent: Jun. 7, 2022

(54) HOST, SYSTEM AND METHOD FOR FACILITATING DEBUGGING IN BOOTING

(71) Applicant: Mitac Computing Technology Corporation, Taoyuan (TW)

(72) Inventors: Yen-Hui Chang, Taoyuan (TW); Hui-Ling Chen, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 192 days.

(21) Appl. No.: 16/989,049

(22) Filed: Aug. 10, 2020

(65) Prior Publication Data

US 2021/0064491 A1 Mar. 4, 2021

(30) Foreign Application Priority Data

Sep. 4, 2019 (TW) ................................. 108131800

(51) Int. Cl.
*G06F 11/22* (2006.01)
*G06F 1/26* (2006.01)
*G06F 13/40* (2006.01)
*G06F 11/10* (2006.01)
*G06F 11/32* (2006.01)

(52) U.S. Cl.
CPC ............ *G06F 11/2284* (2013.01); *G06F 1/26* (2013.01); *G06F 11/10* (2013.01); *G06F 13/4022* (2013.01); *G06F 11/2268* (2013.01); *G06F 11/321* (2013.01)

(58) Field of Classification Search
CPC .. G06F 11/10; G06F 11/2268; G06F 11/2284; G06F 11/321; G06F 11/3476
See application file for complete search history.

(56) References Cited

U.S. PATENT DOCUMENTS

| 10,217,089 | B2* | 2/2019 | Celinder | G06Q 10/20 |
|---|---|---|---|---|
| 2008/0111666 | A1* | 5/2008 | Plante | G07C 5/085 340/425.5 |
| 2011/0047427 | A1 | 2/2011 | Bailey et al. | |
| 2011/0185234 | A1* | 7/2011 | Cohen | G06F 11/3476 714/E11.029 |
| 2016/0034146 | A1* | 2/2016 | Daly, Jr. | G06F 3/04842 715/735 |
| 2017/0013003 | A1* | 1/2017 | Samuni | G06F 11/3438 |

(Continued)

OTHER PUBLICATIONS

Search Report appended to an Office Action, which was issued to Taiwanese counterpart application No. 108131800 by the TIPO dated Oct. 16, 2020, with an English translation thereof.

*Primary Examiner* — Joseph O Schell
(74) *Attorney, Agent, or Firm* — MLO, a professional corp.

(57) ABSTRACT

A system includes a host and a display. The host includes a programmable logic device (PIP), a baseboard management controller (BMC) and a switch. The PLD performs a power-on procedure based on a power-on sequence code, generates variable character information in the power-on procedure, and fills the variable character information into a variable field in a preset log text file to result in an updated log text file. When it is determined that the power-on procedure is not normally completed, the PLD controls the switch to switch to a debug mode, and transmits a video signal containing debug information corresponding to the updated log text file to the switch so that the video signal is outputted to the display.

20 Claims, 5 Drawing Sheets

(56) References Cited

U.S. PATENT DOCUMENTS

2018/0018127 A1   1/2018  Thomas et al.
2018/0171921 A1*  6/2018  Park .................. F02D 41/40
2021/0205027 A1*  7/2021  Leist .................. A61B 90/37

* cited by examiner

```
CPLD Power Sequence Debug Funciton,Please Enter a Character.
5 : Read Power Sequence Information.
Power Sequence Current State is S17.
| Signal Name          | Sta | Val | Pol | Pin    |
| PCH_SLPSUS_N         |     |     |  H  | FL14B  |
| PGD_P1V8_PCH_STBY    |     |     |  H  | PT17A  |
| PGD_PVNN_PCH_STBY    |     |     |  H  | PT17C  |
| PGD_P1V05_PCH_STBY   |     |     |  H  | FL11C  |
| RST_RSMRST_N         | N/A |     |  H  | PT11D  |
| PGD_P1V15_STBY       |     |     |  H  | PT24B  |
| BMC_SRST_N           | N/A |     |  H  | FR13C  |
| RST_BMC_EXTRST_N     | N/A |     |  H  | PR1A   |
| PGD_PCH_DSW_PWROK_R  | N/A |     |  H  | PT11C  |
| PCH_SLP_S4_N         |     |     |  H  | PT12A  |
| CPLD_PGD_PS          |     |     |  H  | PR4A   |
| PGD_P5V              |     |     |  H  | PT19C  |
| PGD_P3V3             |     |     |  H  | FR6D   |
| CPU0_PRES_N          | N/A |     |  L  | PB21A  |
| CPU1_PRES_N          | N/A |     |  L  | PB22C  |
| PGD_P2V5_M0_ABC_VPP  |     |     |  H  | FB9B   |
| PGD_P2V5_M0_DEF_VPP  |     |     |  H  | PB21C  |
| PGD_P2V5_M1_ABC_VPP  |     |     |  H  | PB25B  |
| PGD_P2V5_M1_DEF_VPP  |     |     |  H  | FR6C   |
| PGD_PVDDQ_CPU0_ABC_DDR4 |  |     |  H  | PB8A   |
| PGD_PVDDQ_CPU0_DEF_DDR4 |  |     |  H  | PB21B  |
| PGD_PVDDQ_CPU1_ABC_DDR4 |  |     |  H  | FL12C  |
| PGD_PVDDQ_CPU1_DEF_DDR4 |  |     |  H  | PR7A   |
| PGD_P0V6_M0_ABC_VTT  |     |     |  H  | PB18D  |
| PGD_P0V6_M0_DEF_VTT  |     |     |  H  | FB21D  |
| PGD_P0V6_M1_ABC_VTT  |     |     |  H  | PR9D   |
| PGD_P0V6_M1_DEF_VTT  |     |     |  H  | PB8D   |
```

FIG. 4

```
CPLD Power Sequence Debug Funciton,Please Enter a Character.
5 : Read Power Sequence Information.
Power Sequence Current State is S17.
| Signal Name              | Sta | Val | Pol | Pin   |
| PCH_SLPSUS_N             | S00 |  H  |  H  | PL14B |
| PGD_P1V8_PCH_STBY        | S00 |  H  |  H  | PT17A |
| PGD_PVNN_PCH_STBY        | S01 |  H  |  H  | PT17C |
| PGD_P1V05_PCH_STBY       | S02 |  H  |  H  | PL11C |
| RST_RSMRST_N             | N/A |  H  |  H  | PT11D |
| PGD_P1V15_STBY           | S04 |  H  |  H  | PT24B |
| BMC_SRST_N               | N/A |  H  |  H  | PR13C |
| RST_BMC_EXTRST_N         | N/A |  H  |  H  | PR1A  |
| PGD_PCH_DSW_PWROK_R      | N/A |  H  |  H  | PT11C |
| PCH_SLP_S4_N             | S05 |  H  |  H  | PT12A |
| CPLD_PGD_PS              | S06 |  H  |  H  | PR4A  |
| PGD_P5V                  | S07 |  H  |  H  | PT19C |
| PGD_P3V3                 | S08 |  H  |  H  | PR6D  |
| CPU0_PRES_N              | N/A |  L  |  L  | PB21A |
| CPU1_PRES_N              | N/A |  L  |  L  | PB22C |
| PGD_P2V5_M0_ABC_VPP      | S09 |  H  |  H  | PB9B  |
| PGD_P2V5_M0_DEF_VPP      | S09 |  H  |  H  | PB21C |
| PGD_P2V5_M1_ABC_VPP      | S09 |  H  |  H  | PB25B |
| PGD_P2V5_M1_DEF_VPP      | S09 |  H  |  H  | PR6C  |
| PGD_PVDDQ_CPU0_ABC_DDR4  | S10 |  H  |  H  | PB8A  |
| PGD_PVDDQ_CPU0_DEF_DDR4  | S10 |  H  |  H  | PB21B |
| PGD_PVDDQ_CPU1_ABC_DDR4  | S10 |  H  |  H  | PL12C |
| PGD_PVDDQ_CPU1_DEF_DDR4  | S10 |  H  |  H  | PR7A  |
| PGD_POV6_M0_ABC_VTT      | S11 |  H  |  H  | PB18D |
| PGD_POV6_M0_DEF_VTT      | S11 |  H  |  H  | PB21D |
| PGD_POV6_M1_ABC_VTT      | S11 |  H  |  H  | PR9D  |
| PGD_POV6_M1_DEF_VTT      | S11 |  H  |  H  | PB8D  |
```

FIG. 5

HOST, SYSTEM AND METHOD FOR FACILITATING DEBUGGING IN BOOTING

CROSS-REFERENCE TO RELATED APPLICATION

This application claims priority of Taiwanese Invention Patent Application No. 108131800, filed on Sep. 4, 2019.

FIELD

The disclosure relates to a host and a system capable of facilitating debugging in booting, and a method to be implemented by the system for facilitating debugging in booting.

BACKGROUND

Referring FIG. 1, a conventional system capable of facilitating debugging in booting is illustrated. The conventional system includes a host 11 (e.g., a server), a monitoring device 13 (e.g., a personal computer), and a board function test (BFT) board 12 that is electrically connected between the host 11 and the monitoring device 13. The host 11 includes an input/output (I/O) terminal 112, and a complex programmable logic device (CPLD) 111 that performs a power-on procedure based on a predetermined power sequence so as to sequentially activate power components of the host 11 in booting. The BET board 12 includes another CPLD 111', and a connecting component 121 that connects the BET board 12 to the host 11 and the monitoring device 13. Failure to activate any one of the power components of the host 11 in booting would cause errors in operation of a finite-state machine of the CPLD 111 of the host 11. For this scenario, the BFT board 12 is utilized to assist debugging. However, requirement of the BFT board 12 incurs additional hardware cost. Further, the BFT board 12 occupies additional space. Moreover, maintenance staffs have to spend time on manual connection of the BFT board 12 with the host 11 and the monitoring device 13, resulting in inconvenience.

SUMMARY

Therefore, an object of the disclosure is to provide a host and a system capable of facilitating debugging in booting, and a method for facilitating debugging in booting that can alleviate at least one of the drawbacks of the prior art.

According to one aspect of the disclosure, the host includes video output terminal, a programmable logic device (PLD), a baseboard management controller (EMC) and a switch.

The PLD is configured to store in advance a preset log text file which contains constant characters and variable fields of a log.

The switch has a switch output terminal, a first input terminal that is electrically connected to the PLD, and a second input terminal that is electrically connected to the BMC, and is configured to be controlled to establish an electrical connection between the switch output terminal and one of the first and second input terminals.

The video output terminal is electrically connected to the switch output terminal of the switch, and is configured to be connected to a display.

The PLD is configured to obtain a power-on sequence code, perform a power-on procedure based on the power-on sequence code, and generate variable character information.

The PLD is configured to fill the variable character information into at least one of the variable fields in the preset log text file which corresponds to the variable character information to result in an updated log text file, and determine whether the power-on procedure is normally completed. The PLD is configured to, when it is determined that the power-on procedure is not normally completed, control the switch to switch to a debug mode where the electrical connection between the switch output terminal and the first input terminal is established so that the PLD is electrically connected to the video output terminal via the switch. The PLD is configured to transmit an error correction video signal which contains debug information corresponding to the updated log text file to the switch in the debug mode so that the error correction video signal is outputted via the video output terminal.

According to another aspect of the disclosure, the system includes the host that is described above, and a display that is electrically connected to the video output terminal of the host.

The display is configured to, when the switch is in the debug mode, receive the error correction video signal and display the debug information corresponding to the updated log text file.

According to still another aspect of the disclosure, the method is adapted to be implemented by the system that is described above. The method includes steps of:

A) by the BID, obtaining a power-on sequence code, performing a power-on procedure based on the power-on sequence code, and determining whether the power-on procedure is normally completed, the power-on procedure including a plurality of stages;

B) controlling, by the BID when it is determined that the power-on procedure is not normally completed, the switch to switch to a debug mode where the PLD is electrically connected to the video output terminal via the switch;

C) generating, by the PLD based on the power-on procedure, a state machine code that corresponds to a current stage among the stages of the power-on procedure that is currently performed, and a detected signal value that corresponds to the state machine code;

D) converting, by the PLD, one of the state machine code, the detected signal value and a combination thereof into variable character information having a text file format;

E) filling, by the PLD, the variable character information into at least one of the variable fields in the preset log text file which corresponds to the variable character information so as to result in an updated log text file; and F) transmitting, by the PLD, an error correction video signal which contains debug information corresponding to the updated log text file to the switch in the debug mode so that the error correction video signal is outputted via the video output terminal.

BRIEF DESCRIPTION OF THE DRAWINGS

Other features and advantages of the disclosure will become apparent in the following detailed description of the embodiment with reference to the accompanying drawings, of which:

FIG. 4 is a schematic diagram exemplarily illustrating an embodiment of a preset log text file according to the disclosure; and FIG. 5 is a schematic diagram exemplarily illustrating an embodiment of an updated log text file according to the disclosure.

DETAILED DESCRIPTION

Figure 2:
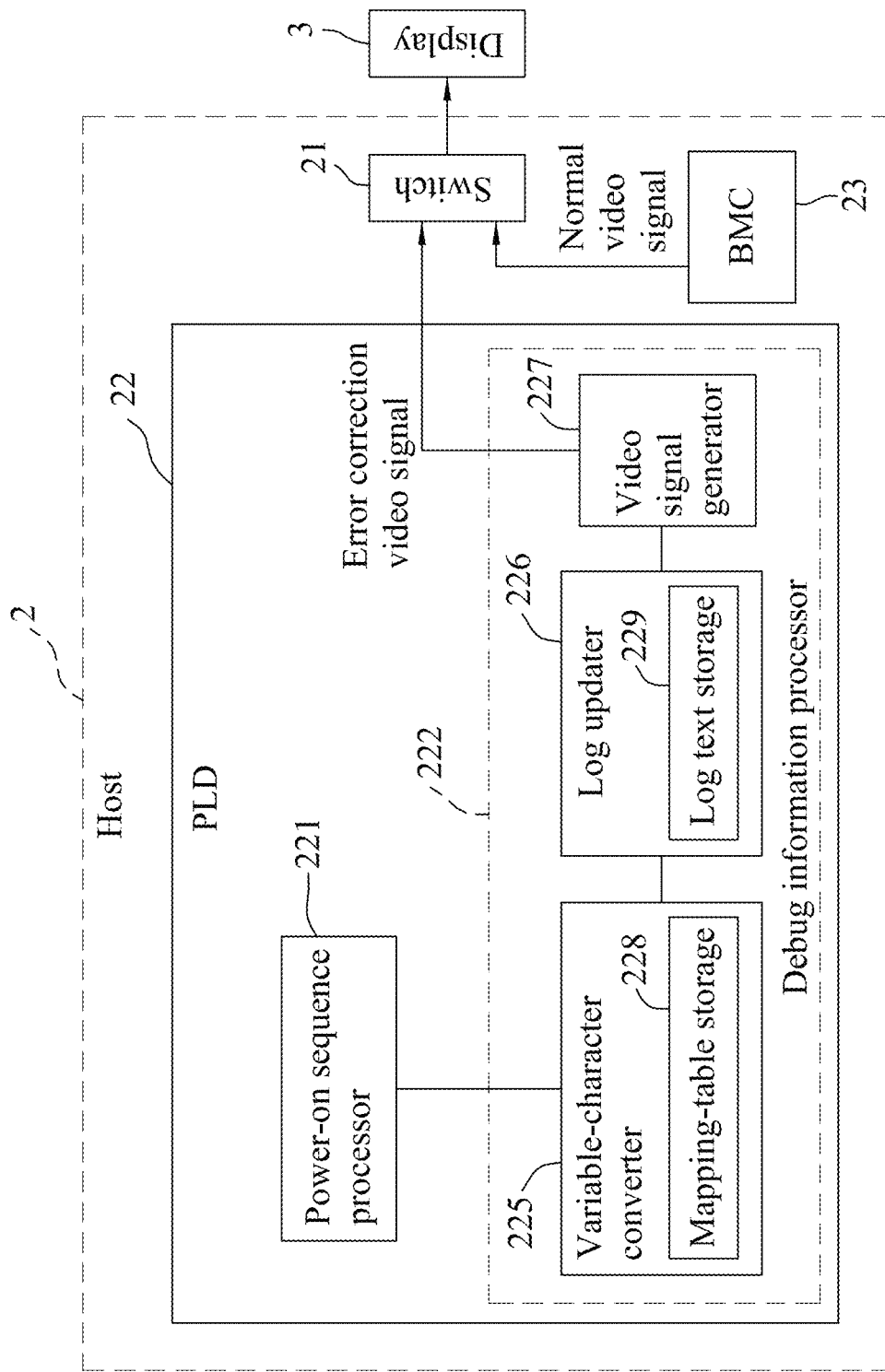
FIG. 2 is a block diagram illustrating an embodiment of a system for facilitating debugging in booting according to the disclosure.

Referring to FIG. 2, an embodiment of a system capable of facilitating debugging in booting according to the disclosure is illustrated. The system includes a host 2 and a display 3. The host 2 has a video output terminal. The display 3 has a video input terminal that is electrically connected to the video output terminal of the host 2. The host 2 may be implemented by a server, such as a computing server or a data server, or a case with computing components of a personal computer, but implementation of the host 2 is not limited to the disclosure herein and may vary in other embodiments. The display 3 may be implemented by a projector, a light-emitting diode (LED)/liquid-crystal display (LCD) monitor of a personal computer, or a screen of a notebook computer or a tablet computer, but implementation thereof is not limited to what are disclosed herein and may vary in other embodiments. In this embodiment, the host 2 is a server, and the display 3 is an LED monitor of a personal computer.

The host 2 includes a switch 21, a programmable logic device (PLD) 22 and a baseboard management controller BMC) 23.

The switch 21 has a switch output terminal which is electrically connected to the video output terminal of the host 2, a first input terminal which is electrically connected to the PLD 22, and a second input terminal which is electrically connected to the BMC 23. The switch 21 is configured to be controlled by the PLD 22 or the BMC 23 to establish an electrical connection between the switch output terminal and one of the first and second input terminals. Specifically speaking, the switch 21 is switchable between a debug mode and a normal mode. When the switch 21 is in the debug mode, the electrical connection between the switch output terminal and the first input terminal is established, and the electrical connection between the switch output terminal and the second input terminal is cut off. On the other hand, when the switch 21 is in the normal mode, the electrical connection between the switch output terminal and the first input terminal is cut off, and the electrical connection between the switch output terminal and the second input terminal is established. In this way, an error correction video signal generated by the PLD 22 can be outputted via the video output terminal to the display 3 for display when the switch 21 is in the debug mode, and a normal video signal generated by the BMC 23 can be outputted via the video output terminal to the display 3 for display when the switch 21 is in the normal mode. In this embodiment, the switch 21 is implemented by a jumper for configuring the electrical connections. However, implementation of the switch 21 is not limited thereto and may be implemented by a 2-to-1 digital multiplexer or by a 2-to-1 mechanical switch in other embodiments.

The PLD 22 is implemented by a complex programmable logic device (CPLD) in this embodiment, but implementation of the PLD 22 is not limited thereto and may be implemented by a field programmable gate array (FPGA) in other embodiments.

The PLD 22 is configured to store in advance a preset log text file as shown in FIG. 4. The preset log text file contains constant characters and variable fields of a log (e.g., the rectangular blanks in FIG. 4), which is utilized to record information of signals that are related to a power-on procedure. In this embodiment, the preset log text file has a file name "const._log_file.txt". The constant characters and the variable fields are arranged in a constant manner at predefined positions in the log in a predefined format. The preset log text file shows a header foreword at the beginning of the log, followed by a column of signal names of detected signals under the title "Signal Name", a column of state machine codes under the title "Sta", a column of detected signal values under the title "Val", a column of reference signal values under the title "Pol" which correspond to expected normal signal values, and a column of pin names under the title "Pin" which correspond to pins where the detected signals are detected. However, implementation of the preset log text file is not limited to the disclosure herein and may vary in other embodiments. The preset log text file may contain other information for facilitating debugging in booting.

The PLD 22 is configured to obtain a plurality of power-on sequence codes, to perform the power-on procedure based on the power-on sequence codes, to generate variable character information related to execution of the power-on procedure, and to fill the variable character information into at least one of the variable fields in the preset log text file which corresponds to the variable character information to result in an updated log text file as shown in FIG. 5. The PLD 22 is configured to determine whether the power-on procedure is normally completed, and when it is determined that the power-on procedure is not normally completed, to control the switch 21 to switch to the debug mode so that the PLD 22 is electrically connected to the video output terminal via the switch 21. Subsequently, the PLD 22 is configured to transmit to the switch 21 in the debug mode the error correction video signal which contains debug information corresponding to the updated log text file so that the error correction video signal is outputted via the video output terminal. The display 3 is configured to receive the error correction video signal and display the debug information corresponding to the updated log text file.

Specifically speaking, the PLD 22 is programmed in advance by burning fuses that define connection from input wires to logic gates to include a power-on sequence processor 221, and a debug information processor 222 that is electrically connected to the power-on sequence processor 221.

The power-on sequence processor 221 is configured to sequentially obtain the power-on sequence codes, to sequentially activate finite-state machines (FSMs) included in the power-on sequence processor 221 and respectively corresponding to the power-on sequence codes so as to perform the power-on procedure, and to determine whether the power-on procedure is normally completed. The power-on sequence processor 221 outputs a plurality of state machine codes that are related to the FSMs, and at least one detected signal value for each of the state machine codes. More specifically, each of the FSMs corresponds to a state task set, and the state task set includes at least one state task, which corresponds to the detected signal value. The power-on procedure includes a plurality of stages, i.e., power-on stages Each of the state machine codes indicates a respective one of the stages of the power-on procedure. In one embodiment, the power-on sequence processor 211 generates, based on the power-on procedure, the state machine code that corresponds to a current stage among the stages of the power-on procedure that is currently performed, and the detected signal value that corresponds to the state machine code.

It is worth noting that the power-on sequence codes include a plurality of sequentially arranged logical values (e.g., "1" or "0") each of which corresponds to a voltage level (e.g., "High (H)" or "Low (L)") detected by the PLD 22 via a pin of a hardware device, such as a pin of the BMC 23, a pin of a central processing unit (CPU), a pin of a platform controller hub (PCH), a test point on a circuit board of a server, a pin of a power transformer component, or the like. Through analyzing the voltage levels detected via functional pins of a controller, the PLD 22 is able to determine whether functions of the controller are normally activated in a predefined order. For example, in a scenario where the BMC 23 is normally activated, the PLD 22 would detect, via a reset-related pin (e.g., a pin for outputting a signal "BMC_SRST_N") of the BMC 23, that reset-related functions are activated at first, and then detect, via storage-related pins (e.g., pins for outputting signals "RST_RSMRST_N" and "RST_BMC_EXTRST_N") of the BMC 23, that storage-related functions are activated afterward. For CPUs that are produced by the same manufacturer and that are released with an identical product version, the order in which functions of one of the CPU are activated would be identical to the order in which functions of another one of the CPUs are activated.

When one of the FSMs in the power-on procedure is not normally completed and a flow of the power-on procedure stops at one of the state task(s) of the state task set corresponding to the one of the FSMs, the system crashes and is unable to launch basic input/output system (BIOS) to perform power-on self-test (POST). When it is determined by the power-on sequence processor 221 that the power-on procedure is not normally completed, the PLD 22 controls the switch 21 to switch from the normal mode to the debug mode.

Figure 1:
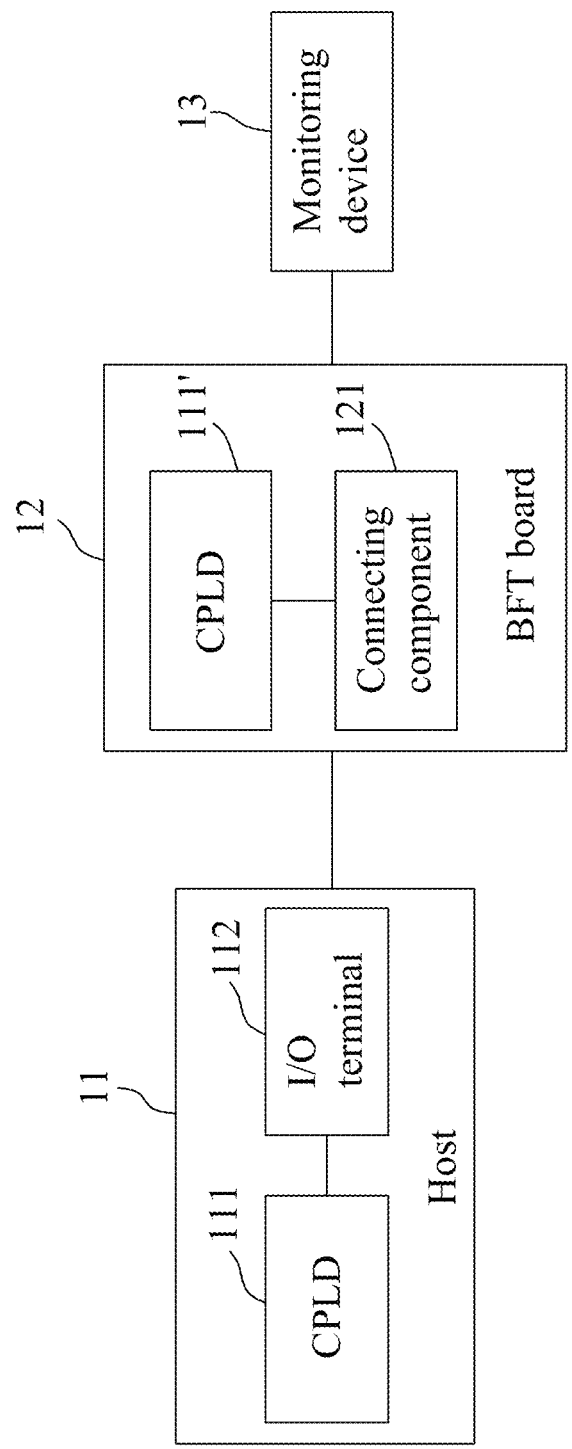
FIG. 1 is a block diagram illustrating a conventional system for facilitating debugging in booting.

The debug information processor 222 is configured to store the preset log text file. The debug information processor 222 is further configured to receive the state machine codes and the corresponding detected signal values from the power-on sequence processor 221, and then to convert the state machine codes and the detected signal values into the variable character information. As previously described, the constant characters contained in the preset log text file include the pin names of the detected signals (see FIGS. 1 and 5). In addition, the power-on sequence processor 221 further transmits some of the logic values, which are included in the power-on sequence codes and which correspond to the voltage levels detected at the pins of the hardware devices, as hardware signals to the debug information processor 222. The hardware signals may be transmitted along with corresponding state machine code(s).

Specifically speaking, the debug information processor 222 includes a variable-character converter 225, a log updater 226 that is electrically connected to the variable-character converter 225, and a video signal generator 221 that is electrically connected to the log updater 226.

The variable-character converter 225 electrically connected to the power-on sequence processor 221, and is configured to receive, according to an order of activation of the FSMs in the power-on procedure, the state machine codes and the detected signal values corresponding to the state machine codes, and to temporarily store the state machine codes and the detected signal values. In this embodiment, the variable-character converter 225 is further configured to receive the hardware signals which are transmitted by the power-on sequence processor 221 and which correspond to the voltage levels detected from a plurality of the hardware devices (i.e., hardware of a server such as the BMC 23, a PCH, or circuits on a motherboard) that are activated in the power-on procedure. The hardware signals may be a signal of the BMC 23 that is related to reset (e.g., "BMC_SRST_N"), signals that are related to Rapid Storage Technology (e.g., "RST_RSMRST_N" and "RST_BMC_EXTRST_N"), and signals that are related to regulation of output power (e.g., "PGD_PCH_D-SW_PWROK_R"). Each of the hardware signals also contains a detected signal value (e.g., "1" or "0", and referred to as a detected hardware value hereinafter).

The variable-character converter 225 includes a mapping-table storage 228 that stores a pre-stored character mapping table. The pre-stored character mapping table is established in advance based on the power-on sequence codes. Since the power-on sequence codes are constant for each booting, correspondence relationships between codes/values and characters recorded in the pre-stored character mapping table are also constant. By means of table-lookup based on the pre-stored character mapping table, according to the order of activation of the FSMs in the power-on procedure, the variable-character converter 225 is further configured to convert each of the state machine codes that is received into respective character sub-information having a text file format, convert each of the detected signal values of the state machine codes into respective character sub-information having the text file format (e.g., "Pass (P)" and "Fail (IF)" respectively corresponding to situations in which the detected signal value is normal and in which the detected signal value is abnormal), and convert each of the detected signal values respectively of the hardware signals (i.e., the detected hardware values) into respective character sub-information corresponding to the hardware signals and having the text file format (e.g., "H" and "L" respectively corresponding to situations in which the voltage level detected by the PLD 22 is high level and in which the voltage level detected by the PLD 22 is low level). The variable character information includes the character sub-information corresponding to each of the state machine codes, position sub-information for filling the character sub-information of each of the state machine codes into the preset log text file, the character sub-information corresponding to each of the detected signal values of the state machine codes, position sub-information for filling the character sub-information of each of the detected signal values into the preset log text file, the character sub-information corresponding to each of the hardware signals, and position sub-information for filling the character sub-information of each of the detected hardware values into the preset log text file. It should be noted that the position sub-information is obtained by means of computation. The variable-character converter 225 records an initial position in a register, and computes a fill-in position for filling the character sub-information of a state machine code into the preset log text file based on the character length of the character sub-information converted from the state machine code, the detected signal value or the detected hardware value. Next, the variable-character converter 225 updates contents of the register based on the fill-in position. For example, in a scenario of filling the character sub-information of the detected hardware value, which does not correspond to any state machine code so that, the term "N/A" already exists in the column of state machine codes in the preset log text file as shown in FIG. 4, the variable-character converter 225 computes the fill-in position for filling the character sub-information of the detected hardware value based on a preset character Length that corresponds to the term "N/A", and updates contents of the register. Subsequently, the variable-character converter 225 computes a next fill-in position for filling the character sub-information of the state machine code in a next row and updates the contents of the register. For each of the state machine codes, the detected signal values and the detected hardware values, the position sub-information includes a display resolution and start display coordinates.

In this embodiment, for each of the hardware signals, the variable-character converter 225 converts only the hardware signal that is expected to appear when the corresponding hardware device is normally activated. For example, the hardware signal "PGD_PCH_DSW_PWROK_R" carried by a signal line to the PLD 22 has a logic "LOW" value by default before activation, and the hardware signal "PGD_PCH_DSW_PWROK_R" would transition to a logic "HIGH" value when the corresponding hardware device has been normally activated. Therefore, the variable-character converter 225 converts only the hardware signal "PGD_PCH_DSW_PWROK_R" that has the logic "HIGH" value.

In one embodiment, display of each of the detected signal values when the system is performing the power-on procedure may contain one of terms "Pass (P)" and "Fail (F)" respectively corresponding to situations in which the detected signal value is normal and in which the detected signal value is abnormal.

The log updater 226 includes a log text storage 229 that stores the preset log text file. When the switch 21 is in either the normal mode or the debug mode, the log updater 226 is configured to sequentially receive the character sub-information from the variable-character converter 225, and to fill the character sub-information into at least one of the variable fields in the preset log text file which corresponds to the variable character information based on the corresponding position sub-information to result in the updated log text.

The video signal generator 227 is configured to receive the updated log text file from the log updates 226, to convert the updated log text file into the error correction video signal conforming with a video format and a voltage level supported by the display 3, and to transmit, the error correction video signal to the switch 21 so that the error correction video signal is outputted via the video output terminal of the PLD 22 when the switch 21 is in the debug mode. In this embodiment, the video format supported by the display 3 is video graphics array (VGA). The error correction video signal includes the character sub-information corresponding to each of the state machine codes, each of the detected signal values, and each of the hardware signals. Specifically, the error correction video signal contains data related to display of characters on a screen, that is, a resolution of each character to be displayed on the screen, and start coordinates corresponding to a starting position for displaying the characters on the screen. In this embodiment, the resolution is the dimension of dot matrix for showing a character, such as 8×12 pixels, and the start coordinates are (1, 1). However, implementations of the resolution and the start coordinates are not limited to the disclosure herein and may vary in other embodiments.

It is worth noting that the normal video signal contains color information for display in the normal mode, a sub-signal "Normal Vsync" for vertical synchronization in the normal mode, and a sub-signal "Normal Hsync" for horizontal synchronization in the normal mode; the error correction video signal contains color information for display in the debug mode, a sub-signal "Vsync" for vertical synchronization in the debug mode, and a sub-signal "Hsync" for horizontal synchronization in the debug mode. When the display 3 is electrically connected to the video output terminal of the host 2 and the switch 21 is in the debug mode, the display 3 receives the error correction video signal via the video output terminal, and displays the debug information corresponding to the updated log text file based on the error correction video signal. The debug information may be displayed in one of a set of primary colors (e.g., red, green and blue), and any combination thereof. In this embodiment, the debug information is displayed in a single color (e.g., green). In this embodiment, the voltage level for logic high of both of the sub-signals "Vsync" and "Hsync" is 5 volts.

It is worth to note that the power-on sequence processor 221, and the variable-character converter 225, the log update 226, the video signal generator 227, the mapping-table storage 228 and the log text storage 229 included in the debug information processor 222 are implemented by the logic gates of the PLD 22.

Figure 3:
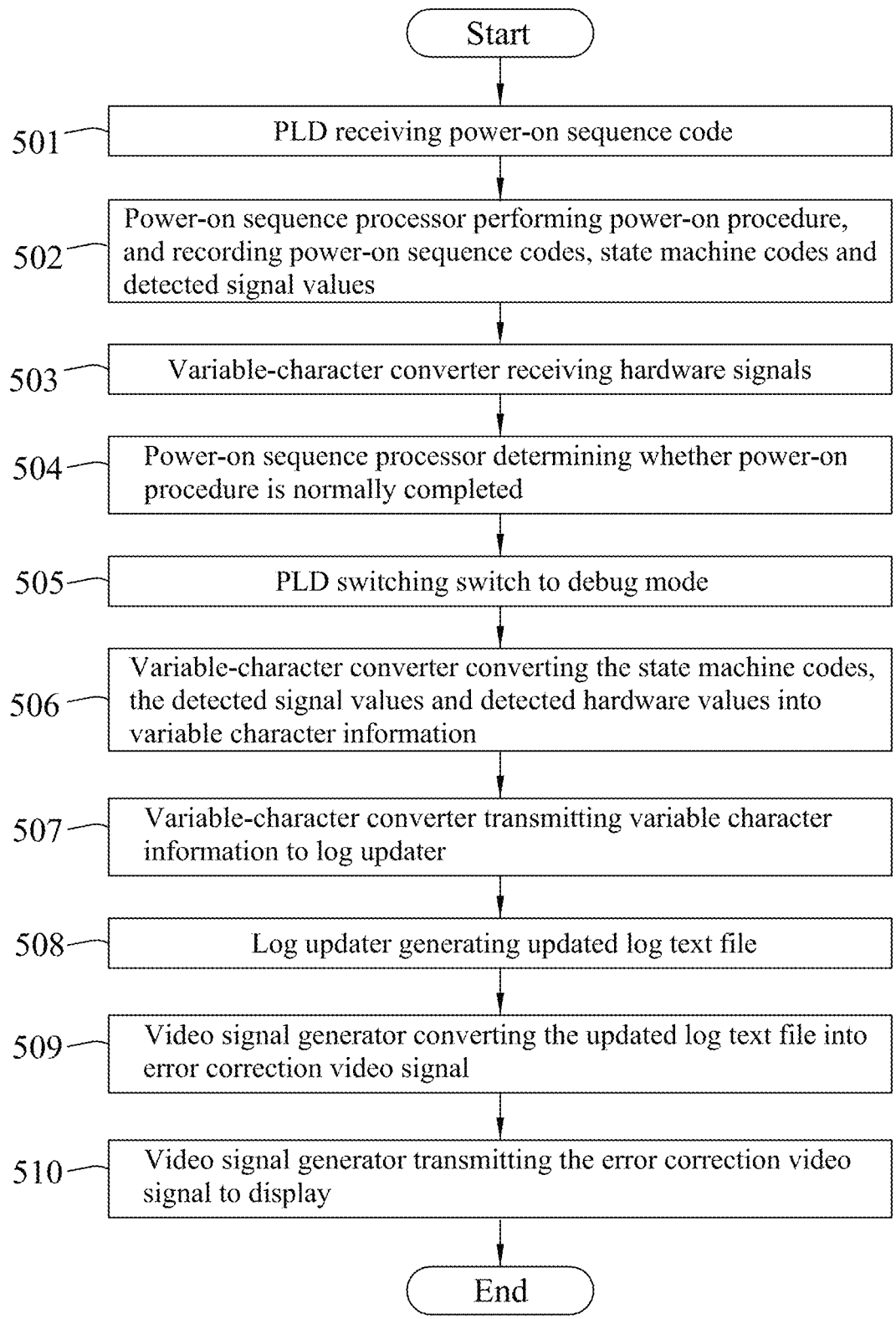
FIG. 3 is a flow chart illustrating an embodiment of a method for facilitating debugging in booting according to the disclosure.

Referring to FIG. 3, an embodiment of a method for facilitating debugging in booting according to the disclosure is illustrated. The method is adapted to be implemented by the system that is previously described. The method includes steps 501 to 510 delineated below.

In step 501, the PLD 22 sequentially receives the power-on sequence codes in the form of bit codes. Then, a flow of procedure of the method proceeds to step 502.

In step 502, the power-on sequence processor 221, based on the power-on sequence codes, sequentially triggers and activates the FSMs respectively corresponding to the power-on sequence codes to perform the respective state task sets so as to carry out the power-on procedure. At the same time, the power-on sequence processor 221 starts timekeeping for each of the state task sets by counting up counting down a preset duration, and sequentially records the power-on sequence codes, the state machine codes and the corresponding detected signal values. Subsequently, the flow of procedure proceeds to step 503.

In step 503, the variable-character converter 225 sequentially receives and records the hardware signals outputted by the hardware devices that are activated in the power-on procedure. Then, the flow of procedure proceeds to step 504.

In step 504, the power-on sequence processor 221 determines whether each of the state task sets of the power-on procedure has been normally completed by the corresponding FSM in the preset duration.

Each time when it is determined that one of the state task sets has been normally completed in the corresponding preset duration, the power-on sequence processor 221 further determines whether the power-on sequence code corresponding to a current one of the FSMs being activated is the last one in the power-on procedure. When it is determined that the power-on sequence code is not the last one of the power-on sequence codes in the power-on procedure, the power-on sequence processor 221 triggers and activates a next one of the ESMs corresponding to the following power-on sequence code to perform the corresponding state task set. Otherwise, when it is determined that the power-on sequence code is the last one of the power-on sequence codes, the CPU (not shown) takes over to launch the BIOS for performance of POST.

On the other hand, when it is determined that one of the state task sets of the power-on procedure is not normally completed by the corresponding FSM in the preset duration, the flow of procedure proceeds to step 505.

In step 505, the PLD 22 controls the switch 21 to switch to the debug mode so that the error correction video signal generated by the PLD 22 can be transmitted to the display 3. Then, the flow of procedure proceeds to step 506.

In step 506, the variable-character converter 225 sequentially receives the state machine codes and the detected signal values from the power-on sequence processor 221. Thereafter, the variable-character converter 225 converts, by means of table-lookup based on the pre-stored character mapping table, the state machine codes, the detected signal values and the detected hardware values into the respective character sub-information so as to obtain the variable character information. Then, the flow of procedure proceeds to step 507.

In step 507, the variable-character converter 225 sequentially transmits the variable character information to the log updater 226. Then, the flow of procedure proceeds to step 508.

In step 508, the log updater 226 fills the variable character information into at least one of the variable fields in the preset log text file which corresponds to the variable character information so as to result in the updated log text file. In this embodiment, the log updater 226 fills into at least one of the variable fields in the preset log text file the character sub-information corresponding to at least one of the state machine codes, the detected signal values and the hardware signals. Then, the flow of procedure proceeds to step 509.

In step 509, the log updater 226 serially outputs the updated log text file to the video signal generator 227, and then the video signal generator 227 converts the updated log text file into the error correction video signal which contains the debug information corresponding to the updated log text file. Then, the flow of procedure proceeds to step 510.

In step 510, the video signal generator 227 transmits the error correction video signal to the switch 21 so that the error correction video signal is outputted via the switch output terminal of the switch 21 and the video output terminal of the host 2 to the display 3 when the switch 21 is in the debug mode. Thereafter, the display 3 displays the debug information corresponding to the updated log text file based on the error correction video signal. Then, the flow of procedure proceeds to the end.

In this way, maintenance staffs are able to debug by reading the debug information provided by the display 3. That is to say, by comparing the detected signal values with the reference signal values in the updated log text file as shown in FIG. 5, the maintenance staffs may be able to pinpoint the last stage right before a crash of the power-on procedure, and to find the cause of failure of the power-on procedure.

In summary, the system and the method for facilitating debugging in booting according to the disclosure utilizes the PLD 22 to generate the variable character information in the power-on procedure and to fill the variable character information into the variable field in the preset log text file to result in the updated log text file. When it is determined that the power-on procedure is not normally completed, the PLD 22 controls the switch 21 to switch to the debug mode, and transmits the error correction video signal containing debug information corresponding to the updated log text file to the switch 21 so that the error correction video signal is outputted to the display 3 for providing the debug information. In this way, no additional hardware such as a board function test (BET) board is required, and hence hardware cost is reduced. In addition, maintenance staffs are able to debug the power-on procedure by inspecting the debug information thus provided without spending time on installing additional hardware. Therefore, efficiency of debugging in booting may be improved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for facilitating debugging in booting, adapted to be implemented by a system for facilitating debugging in booting, the system including a host, the host including a programmable logic device (PLD), a baseboard management controller (BMC), and a switch that is electrically connected to the PLD and the BMC, the host having a video output terminal that is electrically connected to the switch, the PLD storing in advance a preset log text file which contains constant characters and variable fields of a log, the method comprising:

A) by the PLD, obtaining a power-on sequence code, performing a power-on procedure based on the power-on sequence code, and determining whether the power-on procedure is normally completed, the power-on procedure including a plurality of stages;

B) controlling, by the PLD when it is determined that the power-on procedure is not normally completed, the switch to switch to a debug mode where the PLD is electrically connected to the video output terminal via the switch;

C) generating, by the PLD based on the power-on procedure, a state machine code that corresponds to a current stage among the stages of the power-on procedure that is currently performed, and a detected signal value that corresponds to the state machine code;

D) converting, by the PLD, one of the state machine code, the detected signal value and a combination thereof into variable character information having a text file format;

E) filling, by the PLD, the variable character information into at least one of the variable fields in the preset log text file which corresponds to the variable character information so as to result in an updated log text file; and F) transmitting, by the PLD, an error correction video signal which contains debug information corresponding to the updated log text file to the switch in the debug mode so that the error correction video signal is outputted via the video output terminal.

2. The method as claimed in claim 1, wherein step D) includes:
by the PLD by means of table-lookup based on a pre-stored character mapping table, converting the state machine code into character sub-information having a text file format, and converting the detected signal value into character sub-information having the text file format, the variable character information including the character sub-information corresponding to the state machine code and the character sub-information corresponding to the detected signal value.

3. The method as claimed in claim 1, subsequent to step A), further comprising:
G) obtaining, by the PLD, a plurality of hardware signals from the power-on sequence code, the hardware signal being related to voltage levels at pins of a plurality of hardware devices that are activated in the power-on procedure for operation.

4. The method as claimed in claim 3, wherein step G) includes:
converting, by the PLD by means of table-lookup based on a pre-stored character mapping table, detected signal values respectively of the hardware signals into character sub-information having a text file format, the character sub-information corresponding to the hardware signals being included in the variable character information.

5. The method as claimed in claim 1, wherein the constant characters contained in the preset log text file include a plurality of pin names of detected signals.

6. A host capable of facilitating debugging in booting comprising:
a programmable logic device (PLD) configured to store in advance a preset log text file which contains constant characters and variable fields of a log;
a baseboard management controller (BMC);
a switch having a switch output terminal, a first input terminal that is electrically connected to said PLD, and a second input terminal that is electrically connected to said BMC, and configured to be controlled to establish an electrical connection between said switch output terminal and one of said first and second input terminals; and
a video output terminal electrically connected to said switch output terminal of said switch, and configured to be connected to a display,
wherein said PLD is configured to
obtain a power-on sequence code,
perform a power-on procedure based on the power-on sequence code and generate variable character information,
fill the variable character information into at least one of the variable fields in the preset log text file which corresponds to the variable character information to result in an updated log text file,
determine whether the power-on procedure is normally completed,
control, when it is determined that the power-on procedure is not normally completed, said switch to switch to a debug mode where the electrical connection between said switch output terminal and said first input terminal is established so that said PLD is electrically connected to said video output terminal via said switch, and
transmit an error correction video signal which contains debug information corresponding to the updated log text file to said switch in the debug mode so that the error correction video signal is outputted via said video output terminal.

7. The host as claimed in claim 6, wherein said PLD includes:
a power-on sequence processor configured to
receive the power-on sequence code,
perform the power-on procedure based on the power-on sequence code, the power-on procedure including a plurality of stages, and
generate, based on the power-on procedure, a state machine code that corresponds to a current stage among the stages of the power-on procedure that is currently performed, and a detected signal value that corresponds to the state machine code; and
a debug information processor electrically connected to said power-on sequence processor, and configured to
store the preset log text file in advance,
receive the state machine code and the detected signal value from said power-on sequence processor,
convert one of the state machine code, the detected signal value and a combination thereof into the variable character information,
determine whether the power-on procedure is normally completed, and
control, when it is determined that the power-on procedure is not normally completed, said switch to switch to the debug mode.

8. The host as claimed in claim 7, wherein said debug information processor includes:
a variable-character converter including a mapping-table storage that stores a pre-stored character mapping table, and configured to
receive the state machine code and the detected signal value, and
by means of table-lookup based on the pre-stored character mapping table, convert the state machine code into character sub-information having a text file format, and convert the detected signal value into character sub-information having the text file format, the variable character information including the character sub-information corresponding to the state machine code and the character sub-information corresponding to the detected signal value.

9. The host as claimed in claim 8, wherein said variable-character converter is further configured to:
obtain a plurality of hardware signals from the power-on sequence code, the hardware signals being related to voltage levels at pins of a plurality of hardware devices that are activated in the power-on procedure for operation; and
convert, by means of table-lookup based on the pre-stored character mapping table, detected signal values respectively of the hardware signals into character sub-information having a text file format, the character sub-information corresponding to the hardware signals being included in the variable character information.

10. The host as claimed in claim 7, wherein said debug information processor further includes:
a log updater including a log file storage that stores the preset log text file.

11. The host as claimed in claim 7, wherein said debug information processor further includes:
a video signal generator configured to receive the updated log text file, to convert the updated log text file into the error correction video signal conforming with a video format and a voltage level supported by the display, and to transmit the error correction video signal to said switch in the debug mode so that the error correction video signal is outputted via said video output terminal.

12. A system capable of facilitating debugging in booting, comprising:
a host including
a programmable logic device (PLD) that is configured to store in advance a preset log text file which contains constant characters and variable fields of a log,
a baseboard management controller (BMC), and
a switch that has a switch output terminal, a first input terminal which is electrically connected to said PLD, and a second input terminal which is electrically connected to said BMC, said switch being configured to be controlled to establish an electrical connection between said switch output terminal and one of said first and second input terminals, and
a video output terminal that is electrically connected to said switch output terminal of said switch; and
a display electrically connected to said video output terminal of said host,
wherein said PLD is configured to
obtain a power-on sequence code,
perform a power-on procedure based on the power-on sequence code and generate variable character information,
fill the variable character information into at least one of the variable fields in the preset log text file which corresponds to the variable character information to result in an updated log text file,
determine whether the power-on procedure is normally completed,
control, when it is determined that the power-on procedure is not normally completed, said switch to switch to a debug mode where the electrical connection between said switch output terminal and said first input terminal is established so that said PLD is electrically connected to said video output terminal via said switch, and
transmit an error correction video signal which contains debug information corresponding to the updated log text file to said switch in the debug mode so that the error correction video signal is outputted via said video output terminal,
wherein said display is configured to, when said switch is in the debug mode, receive the error correction video signal and display the debug information corresponding to the updated log text file.

13. The system as claimed in claim 12, wherein said PLD includes a power-on sequence processor that is configured to receive the power-on sequence code, and to perform the power-on procedure based on the power-on sequence code.

14. The system as claimed in claim 13, wherein said PLD further includes a debug information processor that is electrically connected to said power-on sequence processor, and that is configured to:

store the preset log text file in advance;
receive from said power-on sequence processor a state machine code and a detected signal value that corresponds to the state machine code;
convert one of the state machine code, the detected signal value and a combination thereof into the variable character information;
determine whether the power-on procedure is normally completed; and
control, when it is determined that the power-on procedure is not normally completed, said switch to switch to the debug mode.

15. The system as claimed in claim 14, wherein said debug information processor includes:
a variable-character converter including a mapping-table storage that stores a pre-stored character mapping table, and configured to
receive the state machine code and the detected signal value, and
by means of table-lookup based on the pre-stored character mapping table, convert the state machine code into character sub-information having a text file format, and convert the detected signal value into the character sub-information having the text file format, the variable character information including the character sub-information corresponding to the state machine code and the character sub-information corresponding to the detected signal value.

16. The system as claimed in claim 15, wherein said variable-character converter is further configured to obtain a plurality of hardware signals from the power-on sequence code, the hardware signals being related to voltage levels at pins of a plurality of hardware devices that are activated in the power-on procedure for operation.

17. The system as claimed in claim 16, wherein said variable-character converter is further configured to convert, by means of table-lookup based on the pre-stored character mapping table, detected signal values respectively of the hardware signals into character sub-information having a text file format, the character sub-information corresponding to the hardware signals being included in the variable character information.

18. The system as claimed in claim 14, wherein said debug information processors is further configured to file the variable character information into at least one of the variable fields in the preset log text file which corresponds to the variable character information to result in the updated log text.

19. The system as claimed in claim 14, wherein said debug information processor further includes:
a log updater including a log text storage that stores the preset log text file.

20. The system as claimed in claim 14, wherein said debug information processor further includes:
a video signal generator configured to receive the updated log text file, to convert the updated log text file into the error correction video signal conforming with a video format and a voltage level supported by the display, and to transmit the error correction video signal to said switch in the debug mode so that the error correction video signal is outputted via said video output terminal.

* * * * *